United States Patent [19]

Boersma

[11] 4,286,705
[45] Sep. 1, 1981

[54] SCRAPER ELEVATOR DRIVE MOUNTING

[75] Inventor: Richard F. Boersma, Springfield, Ill.

[73] Assignee: Fiat-Allis Construction Machinery, Inc., Deerfield, Ill.

[21] Appl. No.: 939,244

[22] Filed: Sep. 5, 1978

Related U.S. Application Data

[63] Continuation-in-part of Ser. No. 749,820, Dec. 13, 1976, Pat. No. 4,179,024.

[51] Int. Cl.$^3$ .................. B65G 19/00; B65G 23/06
[52] U.S. Cl. ............................... 198/719; 198/834
[58] Field of Search .............. 198/200, 717, 719, 725, 198/728, 735, 806, 834 X, 813; 37/8

[56] References Cited

U.S. PATENT DOCUMENTS

| 3,738,031 | 6/1973 | Laft | 37/8 |
| 3,946,859 | 3/1976 | Jeffrey et al. | 198/719 |

Primary Examiner—Robert B. Reeves
Assistant Examiner—Brian Bond
Attorney, Agent, or Firm—August E. Roehrig, Jr.; Robert A. Brown

[57] ABSTRACT

A mounting for a drive mechanism of an elevator used in a carry-type earthmoving scraper wherein the elevator assists in loading material into the scraper. The drive mechanism includes provision for absorbing torsional vibrations generated by flights of the elevator striking material being loaded and, coincident therewith, axial alignment is maintained between driving and driven members of the drive mechanism.

6 Claims, 5 Drawing Figures

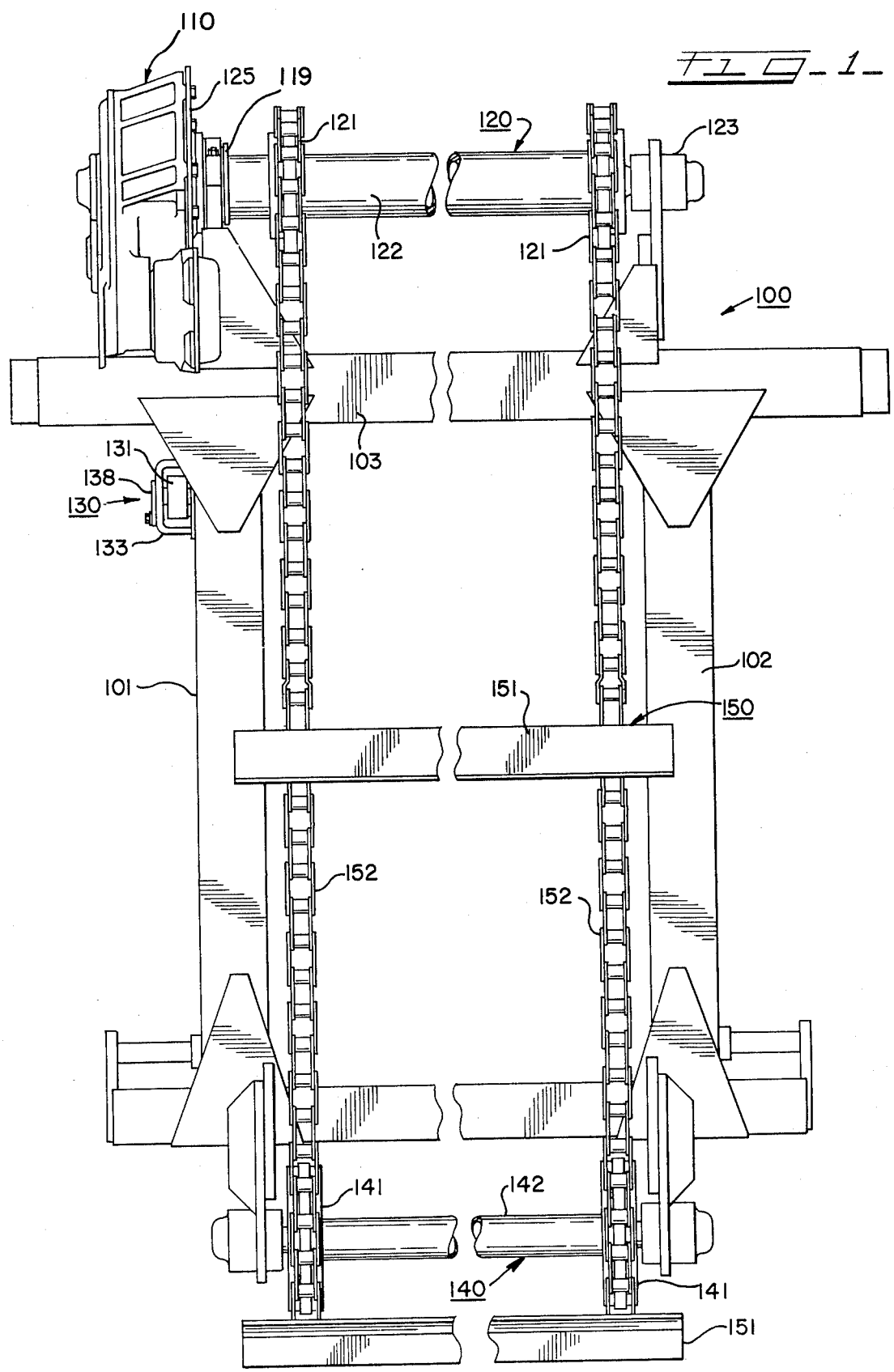

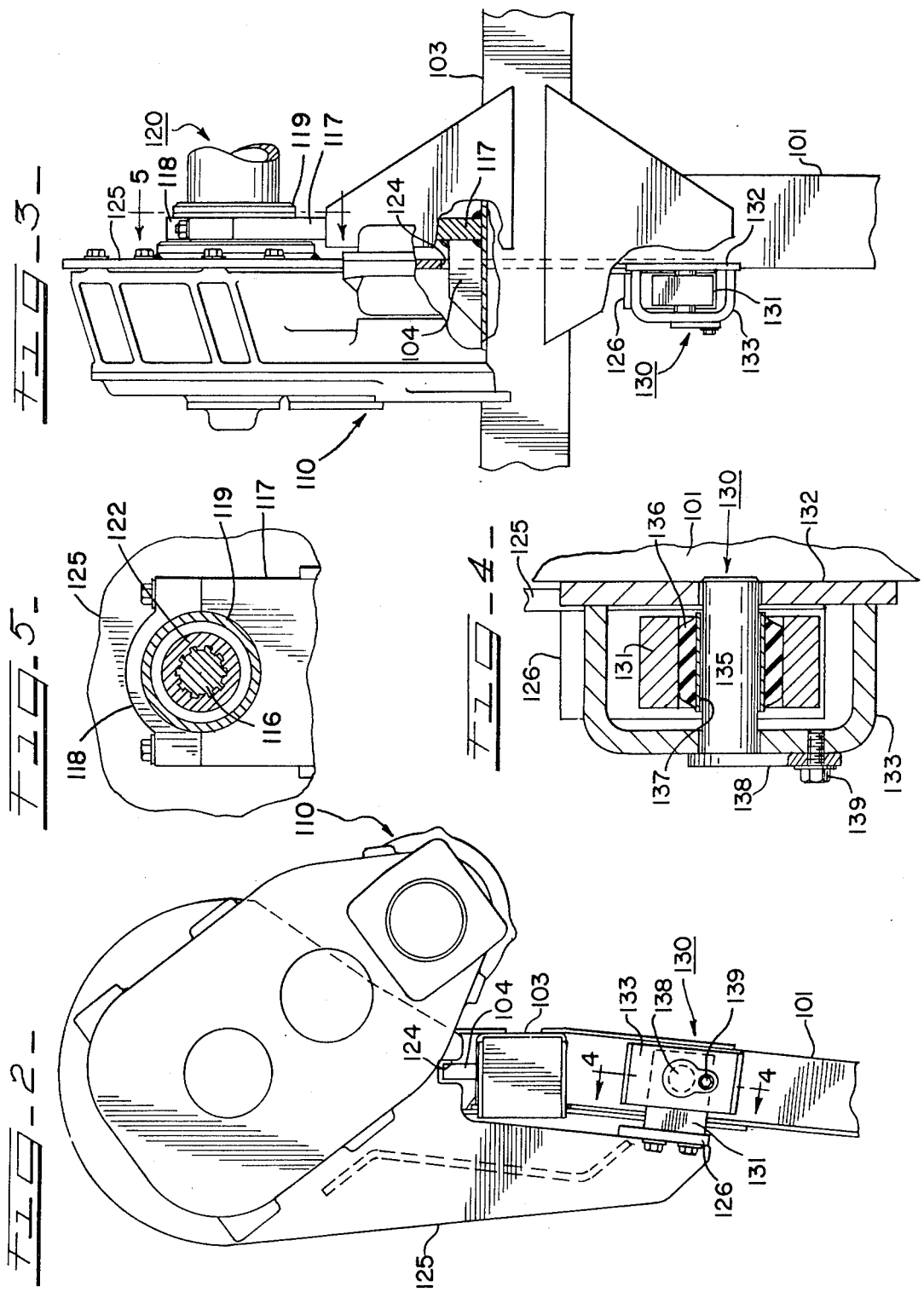

SCRAPER ELEVATOR DRIVE MOUNTING

This is a continuation-in-part of application Ser. No. 749,820, filed Dec. 13, 1976 now U.S. Pat. No. 4,179,024.

BACKGROUND OF THE INVENTION

This invention relates in general to conveyor systems and, in particular, to a heavy duty conveyor system such as used as an elevator on a carry-type scraper wherein the elevator is used to move material into the scraper bowl.

More specifically, but without restriction to the particular use which is shown and described, this invention relates to a mounting for a conveyor or elevator drive to prevent elevator sprocket shaft load-initiated deformation or deflection, and torsional vibration, from causing undue stress on the drive mechanism and particularly on the gear reduction output shaft and bearings contained therein.

Proper alignment between the drive mechanism and an elevator sprocket shaft driven therefrom is particularly important in heavy duty conveyor systems. Rigid mounting of the gear housing, which contains drive reduction gears and an output shaft for coupling to the sprocket shaft, has been found to be undesirable. The sprocket shaft, being relatively long, must be supported for rotation at both laterally positioned ends and be close coupled at one end to the geared drive shaft. Such a shaft and gear reduction housing combination is frequently subjected to misalignment stresses caused by both manufacturing variations when the parts are produced and operational induced loading. Further misalignment is caused by bending loads imposed on the elevator frame and the sprocket shaft. These induced stresses occur along with torsional vibrations which occur when the elevator moving material into the scraper bowl strikes rocks or other such material and frequently results in damage to the elevator system.

Scrapers generally include a box-type structure, referred to as a "bowl", open at its forward end with the bottom or floor of the bowl having an adjustable forward cutting edge adapted to cut a predetermined amount from the upper surface of the ground. The bowl is normally open at its forward end so that the material cut by the cutting edge as it moves through the ground will pass into the bowl. However, as the material is cut it accumulates adjacent to the cutting edge and does not spread uniformly throughout the scraper bowl. Therefore, a conveyor or flight-type elevator must be carried within the bowl and positioned above and to the rear of the cutting edge to receive the material as it is passed into the forward portion of the bowl to move it both rearwardly and upwardly for more complete filling.

These elevators generally comprise a pair of rigidly joined side frame members extending the full length of the elevator and carrying idler wheels at the lower forward end and sprockets at the upper rear end which engage endless link-type chains of a flight-type elevator. Such elevators are normally provided with a mounting frame structure carried on the scraper bowl which permits floating action of the elevator over dirt or material entering the bowl to prevent damage to the elevator or cutting edge when a large stone or other object is hit by the scraper. However, while such structure prevents damage by permitting the elevator to float when large stones or hard material is hit repeatedly, hitting these stones causes torsional vibrations in the drive system frequently damaging the elevator flights because of the rotating inertia of the drive mechanism. Also sprocket shaft deflection, caused by the same action that causes torsional vibration, as well as the occasional trapping of rocks or stones between the sprocket shaft and one or more of the elevator flights, causes deflection of the shaft and misalignment resulting in severe loading of bearings located between the driving mechanism and the driven sprocket shaft.

Other prior art elevator drive mechanisms are resiliently supported on the elevator frame which, to some extent, overcomes some of the adverse effects of the aforementioned sprocket shaft deflection. For example, U.S. Pat. No. 3,543,915 discloses a pivot connection mounting of the drive mechanism on the elevator frame and U.S. Pat. No. 3,046,859 discloses a similar mounting structure.

Another attempt to provide a solution to these problems is disclosed in U.S. Pat. No. 3,738,031 wherein a drive mechanism is pivoted for rocking movement about the elevator drive shaft, and includes a spring positioned between the drive mechanism housing and a frame to permit limited rocking in response to reaction torque which is incurred when shock loads are encountered by the elevator.

While the prior art has provided improved structures to solve the problems of misalignment and torsional vibration, the present invention solves the problem to a greater extent by a simple rugged structure. While this invention is believed to have general applications to all types of conveyor systems, for convenience of illustration, a preferred embodiment will be described with reference to its use in the elevator of a scraper.

SUMMARY OF THE INVENTION

It is, therefore, an object of this invention to improve scraper elevator systems.

Another object of this invention is to improve the torsional vibration damping means of scraper elevator systems.

A further object of this invention is to improve the mounting of the elevator drive mechanism of scraper elevator systems so that misalignment between drive and driven members of the system is prevented.

These and other objects are obtained in accordance with the present invention wherein there is provided an elevator drive mounting for a scraper elevator system which absorbs torsional vibrations generated by the elevator material loading function and, coincident therewith, maintains axial alignment between the driving and driven members of the drive mechanism.

DESCRIPTION OF THE DRAWINGS

Further objects of the invention, together with additional features contributing thereto and advantages accruing therefrom, will be apparent from the following description of one embodiment of the invention when read in conjunction with the accompanying drawings wherein:

FIG. 1 is a horizontal planar view of a portion of a scraper elevator to illustrate the drive mounting system;

FIG. 2 is an enlarged profile view of a portion of the apparatus shown in FIG. 1 to better illustrate the drive torque reaction connection to the elevator frame;

FIG. 3 is an enlarged horizontal planar view of a portion of the drive mounting of FIG. 1 to better illustrate the mounting thereof;

FIG. 4 is an enlarged view of a portion of the resilient connection shown in FIGS. 2 and 3 which provides damping of torsional vibrations; and FIG. 5 is a sectional view along the line 5—5 of FIG. 3 to better illustrate the axially aligned drive mounting and coupling.

DESCRIPTION OF A PREFERRED EMBODIMENT

Although this invention may be used in many conveying systems for varying applications, for convenience of illustration the preferred embodiment is described with reference to its use with a scraper elevator. While the scraper does not form any part of this invention it is believed that a general description of an earthmoving scraper will assist in a better understanding of this invention.

A scraper generally comprises a pair of vertical side walls spaced one from the other by a bottom and a rear wall to define a bowl having an open front end. The scraper bowl is supported at its rear end by a pair of wheels, and at its front end by a connection to a draft vehicle, such as a tractor, which pulls the scraper over the ground. The scraper bowl includes a cutting edge at the front end of the bottom which excavates a predetermined amount of material as the tractor pulls the scraper over the ground.

The amount of material removed from the ground as the scraper passes thereover is controlled by raising or lowering the cutting edge carried at the front end of the bowl. The excavated material will thereafter pass into the scraper bowl as the scraper is pulled forwardly. Since the excavated material has a tendency to pile up and accumulate in the forward portion of the bowl, an endless conveyor or elevator mechanism 100, shown in FIG. 1 and incorporating the subject of this invention, is carried within the bowl adjacent the front end and cutting edge. During excavation, an endless chain conveyor 150 of the conveyor mechanism 100 moves the excavated material upwardly and rearwardly into the bowl to obtain more complete filling and uniform material distribution.

As best shown in FIG. 1, the conveyor elevator 100 includes drive sprocket and idler wheel assemblies 120 and 140, respectively, rotatably journaled between two spaced parallel frame members 101 and 102 to define the run length of the conveyor. The two spaced parallel frame members 101 and 102 form a frame which is supported between the side walls of the scraper bowl. The endless chain conveyor 150 extends about the drive sprocket and idler wheel assemblies and includes a plurality of drag bars or flights 151 which are appropriately secured to conveyor chains 152.

The idler wheel assembly 140 is rotatably supported between the frame members 101 and 102 at the lowermost end of the conveyor by means of suitably sealed bearings. A pair of idler wheels 141 are secured to an idler spool 142 to be freely rotatable in unison with the idler spool 142 in response to movement of the endless chain conveyor 150 through the excavated material.

The drive sprocket assembly 120 includes a pair of sprockets 121 secured to a rotatable hollow sprocket shaft 122 for driving the endless chain conveyor 150. The drive sprocket assembly 120 is supported from the uppermost end of the elevator and is driven by a drive gear assembly 110 operatively connected thereto which transmits the power from a drive motor, not shown, to the drive sprocket assembly 120 for moving the endless chain conveyor 150 in its endless path of movement through the excavated material. One end of the drive sprocket assembly 120 is in driven engagement with the drive gear assembly 110, hereinafter referred to as the driven end.

As best shown in FIGS. 2, 3 and 5, the drive gear assembly 110 is pivotally supported by a support bracket 117 and retainer cap 118 from frame members 101 by means of a collar or quill 119 fixed to a torque arm 125. The opposite or free end of the drive sprocket assembly 120 is supported on frame member 102 by means of a self-aligning bearing assembly 123. The bearing assembly 123 functions with the torque arm collar 119, connected to the frame member 101, to permit the drive sprocket assembly 120 to properly track the endless chain conveyor 150.

The drive gear assembly 110 has an output shaft 116 (seen in FIG. 5) operatively coupled by a spline connection to the driven end of the drive sprocket assembly 120, and is carried by the frame member 101 on the torque arm 125 to which the drive gear assembly 110 is secured. Torque arm 125 is constrained for limited movement with relation to the frame member 101 to absorb torsional vibrations by a resilient connection or anchor, generally indicated by reference numeral 130, which functions to resist the torque reaction and to absorb torsional vibrations generated by the flights 151 striking rocks and other highly resistant material. An outwardly extending flange 126 carried at the lower end of the torque arm 125 (best seen in FIG. 2) is releasably secured to a bushing block 131 of the resilient connector 130 for ease of initial assembly and servicing.

The resilient connector 130 is secured to the conveyor frame member 101 by means of a base plate 132 and a generally U-shaped support member or plate 133. Both the base plate 132 and the support member 133 are formed with apertures therethrough to receive a coupling pin 135 which functions to operatively join the bushing block 131 with the conveyor frame 101.

In order to restrain the torque arm 125 and thereby absorb the torsional vibrations, the coupling pin 135 is joined to the bushing block 131 by a bushing 136 of resilient material. The bushing 136 is press-fit into an internal bore of the bushing block 131 and the bushing 135 has an internal bore 137 for slidably engaging the coupling pin 135 thereby providing a resilient anchor for the torque arm 125. The pin 135 is formed with a head 138 having an aperture through which a bolt 139 passes to secure the pin 135 to the support plate 133.

While the torque arm 125 and the resilient anchor will permit the drive gear assembly 110 to rock sufficiently to compensate for torsional vibrations generated by the endless chain conveyor 150 within the limits of resiliency of the bushing 136, a stop lug 104 is secured to the elevator frame 103 to define positive limits of movement of the torque arm 125. The stop lug 104 is positioned on the frame 103 to extend within a notch 124 formed in the torque arm 125. In this manner, the maximum movement of the torque arm is limited by the clearance distance between the lug 104 and the notch 124. In addition, the stop lug 104 and the notch 124 are effective as locators when assemblying the drive sprocket assembly and the drive gear assembly 110, with its associated drive motor, to the frame members 101 and 102. It is then a simple maneuver to connect the flange 125 of the torque arm 125 to the bushing block 131.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mounting for a drive gear assembly operatively connected to a drive sprocket assembly of a flight-type elevator for isolating torsional stresses incurred during loading of material comprising a material loading elevator means including an elevator frame and a plurality of material conveying flights supported thereon for movement in a predetermined endless path of movement for loading materials, said plurality of material conveying flights being supported by said elevator frame upon a rotatable drive sprocket assembly and rotatable idler wheels carried by said elevator frame, said drive sprocket assembly having a driven end operatively connected to a drive gear assembly for rotating said drive sprocket assembly to move said plurality of material conveying flights in an endless path of movement, a cantilevered support arm carried by said elevator frame for supporting said drive means, said cantilevered support arm being supported by mounting means upon said elevator frame to effect movement in a plane transverse to the rotational axis of said drive sprocket assembly in response to a predetermined force being applied to one of said plurality of material conveying flights during loading of material, said mounting means comprises a bushing block which torsionally rotates about a longitudinal axis through a resilient bushing.

2. The apparatus of claim 1 wherein an end of said cantilevered support arm is fixedly secured to a bushing block supported about a resilient bushing secured to said elevator frame.

3. The apparatus of claim 2 further including means secured to said elevator frame and positioned adjacent to and spaced from said cantilevered support arm for limiting the movement thereof in a plane transverse to the rotational axis of said roller.

4. The apparatus of claim 2 wherein said resilient bushing is secured about a pin supported on said elevator frame such that movement of said bushing block fixedly secured to said support arm will flex said resilient bushing about said pin.

5. The apparatus of claim 4 wherein said pin is fixedly secured to said elevator frame to prevent movement of said pin relative to said frame during movement of said cantilevered support arm.

6. An elevator having a drive gear assembly mounting for isolating torsional stresses incurred during material loading comprising a drive sprocket assembly and an idler wheel assembly rotatably supported at opposite ends of an elevator frame defining the run length of an elevator moving in an endless path of movement for loading materials, a chain link conveyor carrying a plurality of material conveying flight members and supported about said drive sprocket assembly and said idler wheel assembly, a drive gear assembly carried by a support arm cantilevered from said elevator frame and operatively connected to one end of said drive sprocket assembly, for effecting movement of said chain link conveyor in an endless path of movement, said cantilevered support arm having a support end freely supporting said drive gear assembly and a mounting end resiliently mounted to said elevator frame, said support arm mounting end having a bushing mounted bushing block secured thereto and engaging a coupling pin fixedly secured to said elevator frame such that movement of said support arm will flex the bushing of said bushing mounting bushing block about the longitudinal axis of said coupling pin to isolate or absorb torsional stresses incurred during material loading.

* * * * *